United States Patent [19]

Inaga

[11] 4,223,440
[45] Sep. 23, 1980

[54] CORD-TYPE MOWING MACHINE

[75] Inventor: Hisashi Inaga, Takaidonishi, Japan

[73] Assignee: Kioritz Corporation, Tokyo, Japan

[21] Appl. No.: 961,459

[22] Filed: Nov. 16, 1978

[30] Foreign Application Priority Data

Aug. 4, 1978 [JP] Japan .................................. 53-95059

[51] Int. Cl.³ ...................... A01D 35/26; A01D 55/18
[52] U.S. Cl. ........................................ 30/276; 56/12.7
[58] Field of Search .................... 30/276, 347; 56/12.7

[56] References Cited

U.S. PATENT DOCUMENTS

| | | |
|---|---|---|
| 3,928,911 | 12/1975 | Pittinger ................................ 30/276 |
| 4,043,037 | 8/1977 | Okamoto ............................... 30/276 |
| 4,077,191 | 3/1978 | Pittinger .......................... 30/276 X |
| 4,095,338 | 6/1978 | Naohiko ................................ 30/276 |
| 4,097,991 | 7/1978 | Prouly ................................... 30/276 |

FOREIGN PATENT DOCUMENTS 556632 12/1974 Fed. Rep. of Germany ............ 30/276

Primary Examiner—Jimmy C. Peters
Attorney, Agent, or Firm—Fleit & Jacobson

[57] ABSTRACT

A cord-type mowing machine comprises a rotary head in the form of a housing containing a coil of nylon cord therein. An uncoiled end portion of the cord extends downwardly through the bottom of the housing and is fixedly secured to the housing on its underside and at a point between an axis of rotation of the rotary head and the outer periphery of the housing.

8 Claims, 3 Drawing Figures

CORD-TYPE MOWING MACHINE

This invention relates generally to cord-type mowing machines and more particularly, to an apparatus for attaching a cutting cord of nylon to a rotary head of the mowing machine.

A cord-type mowing machine of this type which have been hitherto proposed comprises a rotary head in the form of a housing fixedly secured to a shaft, and a coil of nylon cord contained in the housing and having an uncoiled portion of said cord extending radially outwardly through the peripheral wall of the housing as a free traveling cutting portion. During rotation of the rotary head at a high speed, this free traveling portion of the cord behaves itself as an enough rigid rod under the centrifugal force to effect cutting of grass in the shearing way. During the cutting operation, however, the free traveling portion of the cord in the form of the rigid rod is frequently bent by being subjected to a cutting resistance against the grass over the length thereof so that significant fatigue in the cord will take place at a connection of the cord with the housing.

A main object of the present invention is to provide a cord-type mowing machine which is capable of minimizing such fatigue in a free traveling portion of a cord.

Another object of the invention is to provide a cord-type mowing machine wherein an end portion of a cord is fixedly secured to the underside of a rotary head at a point between an axis of rotation of the rotary head and its outer periphery in such a manner that a free traveling portion of the cord extends radially outwardly below the rotary head.

According to the invention, there is provided a cord-type mowing machine comprising a rotary head in the form of a housing fixed to a shaft, a coil of nylon cord contained in the housing and having an uncoiled end portion thereof extending downwardly through the bottom of the housing, a downwardly directed bellmouth-like socket provided on the lower portion of the housing and having an outer diameter less than that of the housing, a groove formed in said socket along its inner arcuate surface for guiding and deflecting radially outwardly the end portion of the cord to form a radially extending free traveling portion of the cord, and a retainer threadably secured to the lower end of the shaft for holding the end portion of the cord in the groove in the bellmouth-like socket.

In a preferred embodiment, the end portion of the cord extends downwardly from the inside of the coil of cord through the bottom of the housing. The outer opposite end of the coiled cord is free with respect to the housing.

Preferably, the retainer has an outer arcuate surface complementary to the inner arcuate surface of the bellmouth-like socket. The socket may be formed integrally with the housing or a separate socket may be attached to the housing at its bottom in any suitable manner.

These and other features and advantages of the present invention will become apparent from the following description made in reference to the figures in the accompanying drawings.

Figure 1:
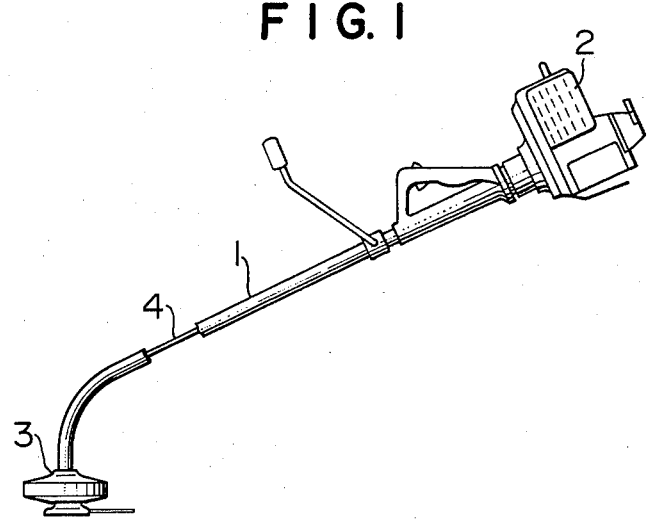
FIG. 1 is a side view showing a cord-type mowing machine having a rotary head according to the present invention.
Figure 2:
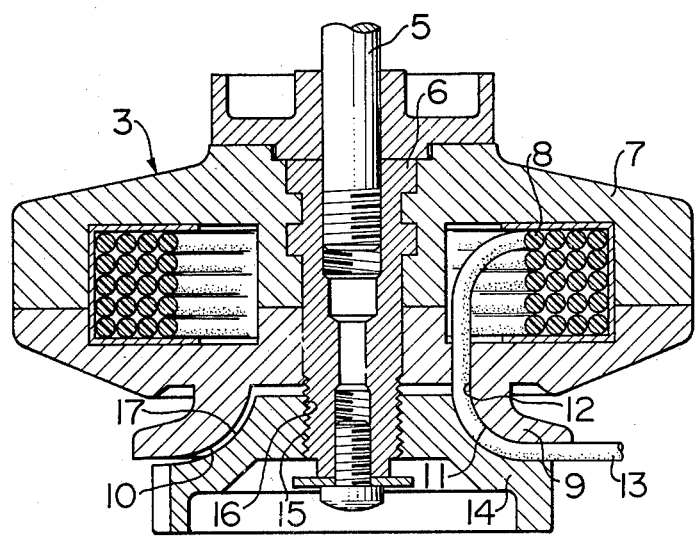
FIG. 2 is a view showing in section the detail of the rotary head shown in FIG. 1.
Figure 3:
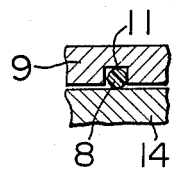
FIG. 3 is a partial view showing in section a groove formed in a bellmouth-like socket, a cord and a retainer of the rotary head.

Referring now to FIG. 1 of the drawings, there is shown herein a cord-type mowing machine comprising a hollow connecting rod 1 having a drive unit 2 such as an engine mounted thereon at its upper end. A mowing unit 3 is rotatably mounted on the rod 1 at its lower end. Drive from the engine 2 is transmitted through a drive shaft 4 in the hollow rod 1 to a shaft 5 to rotate the mowing unit 3. The mowing unit 3 includes a housing 7 defining a rotary head and fixedly secured to an extension 6 of the shaft 5. A coil of nylon cord 8 is contained in the housing 7 in a free condition. In order to facilitate introduction of the coiled cord into the housing 7, it may be divided into two parts which are connected to each other after the housing has been charged with a new coiled cord. The housing 7 is provided on its underside with a downwardly directed bellmouth-like socket 9 having an outer diameter less than that of the housing 7. The bellmouth-like socket 9 may be a part integral with the housing 7 or a separate part connected to the housing in any suitable manner. A groove 11 is formed in the bellmouth-like socket 9 along its inner arcuate surface 10 and communicates with an aperture 12 formed in a bottom portion of the housing 7 in a parallel relation with an axis of the rotary head. The cord 8 is extracted downwardly from the interior of the housing 7 in a parallel retation to the rotary head axis by passing the inner end portion of the coiled cord through the aperture 12 and the extracted end portion of the cord is deflected radially outwardly through the arcuate groove 11 to form a free traveling portion 13 of the cord having a desired length thereof. The outer end of the coiled cord is free with respect to the housing so that the coil of the cord will be freely rotatable without being subjected to any resistance during extraction of the cord from the housing.

A retainer 14 has an inner threaded portion 16 threadably cooperating with an outer threaded portion 15 which is provided on the lower end of the shaft extension 6. The retainer 14 is formed with an arcuate surface 17 complementary to the arcuate surface 10 of the bellmouth-like socket 9. Thus, the retainer 14 is tightly fastened to the bellmouth-like socket 9 by threadable engagement of the inner threaded portion 16 with the outer threaded portion 15 to hold the end portion of the cord in the groove 11 between the arcuate surface 17 of the retainer 14 and the bellmouth-like socket 9.

The mowing unit 3 is rotated according to the desired rotational speed from the engine 2, whereby the free traveling portion 13 of the cord will extend radially outwardly in a rigid manner from the underside of the housing 7 to effect cutting of grass. When the cord has been worn off to become shortened during mowing operation, it is interrupted and the retainer 14 is threadably loosen from the socket to permit extraction of the end portion of the cord from the housing 8 to the desired length.

In accordance with the present invention, the end portion of the cord which extends downwardly through the bottom of the housing, is fixedly secured to the housing on its underside and at a point between the outer periphery of the housing and the axis of the rotary head. With this arrangement, only a part of the free traveling portion extending radially outwardly beyond the housing acts to cut the grass and therefore, the cord portion below the housing is fairly relieved from being subjected to a bending action to minimize fatigue therein. It will be understood in accordance with the present invention that the end portion of the cord is enough tightly held between the bellmouth-like socket and the cooperating retainer to prevent the cord from being accidentally extruded under the centrifugal force during rotation of the rotary head at a high speed.

What is claimed is:

1. A cord-type mowing machine comprising a housing fixedly secured to a shaft and defining a rotary head, a coil of nylon cord contained in said housing and having an uncoiled end portion extending from the inside of the coil downwardly through the bottom of the housing at a point spaced apart radially from an axis of the shaft, a bellmouth-like socket mounted on the underside of said housing and having an outer diameter less than that of said housing, a groove formed in said socket along its inner arcuate surface for guiding and deflecting radially outwardly the end portion of said cord to form a radially extending free traveling portion of said cord, and a retainer threadedly engaging the lower end of said shaft for holding said end portion of the cord in the groove in said bellmouth-like socket.

2. A cord-type mowing machine as claimed in claim 1 wherein said retainer has an outer arcuate surface complementary to said inner arcuate surface of said bellmouth-like socket.

3. A cord-type mowing machine as claimed in claim 1 wherein said bellmouth-like socket is formed integrally with said housing.

4. A cord-type mowing machine including a drive shaft, a housing means secured to said drive shaft and defining a rotary head, means defining an enclosure in said housing means surrounding said drive shaft for accommodating a coil of cord, said housing means including an undersurface extending substantially perpendicular to said drive shaft and said drive shaft having an end portion projecting below said undersurface, means defining a bellmouth socket extending from said undersurface, said bellmouth socket having an outer edge of a diameter smaller than the outer diameter of said housing means, said bellmouth socket further having a lower surface including an arcuate inner portion extending from said undersurface of said housing means and a substantially radial outer portion extending from said arcuate portion to said outer edge, means defining a cord groove in said lower surface of said socket extending from said outer edge of said socket to said undersurface of said housing means, means defining a cord passage in said housing means adjacent said shaft and connecting a radially inner portion of said enclosure with said cord groove and a detachable retainer means on said projecting end portion of said shaft for holding a cord in said groove.

5. A machine as claimed in claim 4 wherein said housing means comprises an upper portion and a lower portion and said bellmouth socket is formed integrally with said lower portion.

6. A machine as claimed in claim 4 wherein said retainer means as an upper surface complementary to said lower surface of said socket.

7. A machine as claimed in claim 4 wherein said retainer means is screw threaded onto said projecting end portion of said shaft.

8. A machine as claimed in claim 4 wherein said passage extends substantially in parallel to said drive shaft.

* * * * *